April 20, 1965 S. D. HURWITT 3,179,476
ROTARY VACUUM SEAL
Filed March 4, 1963
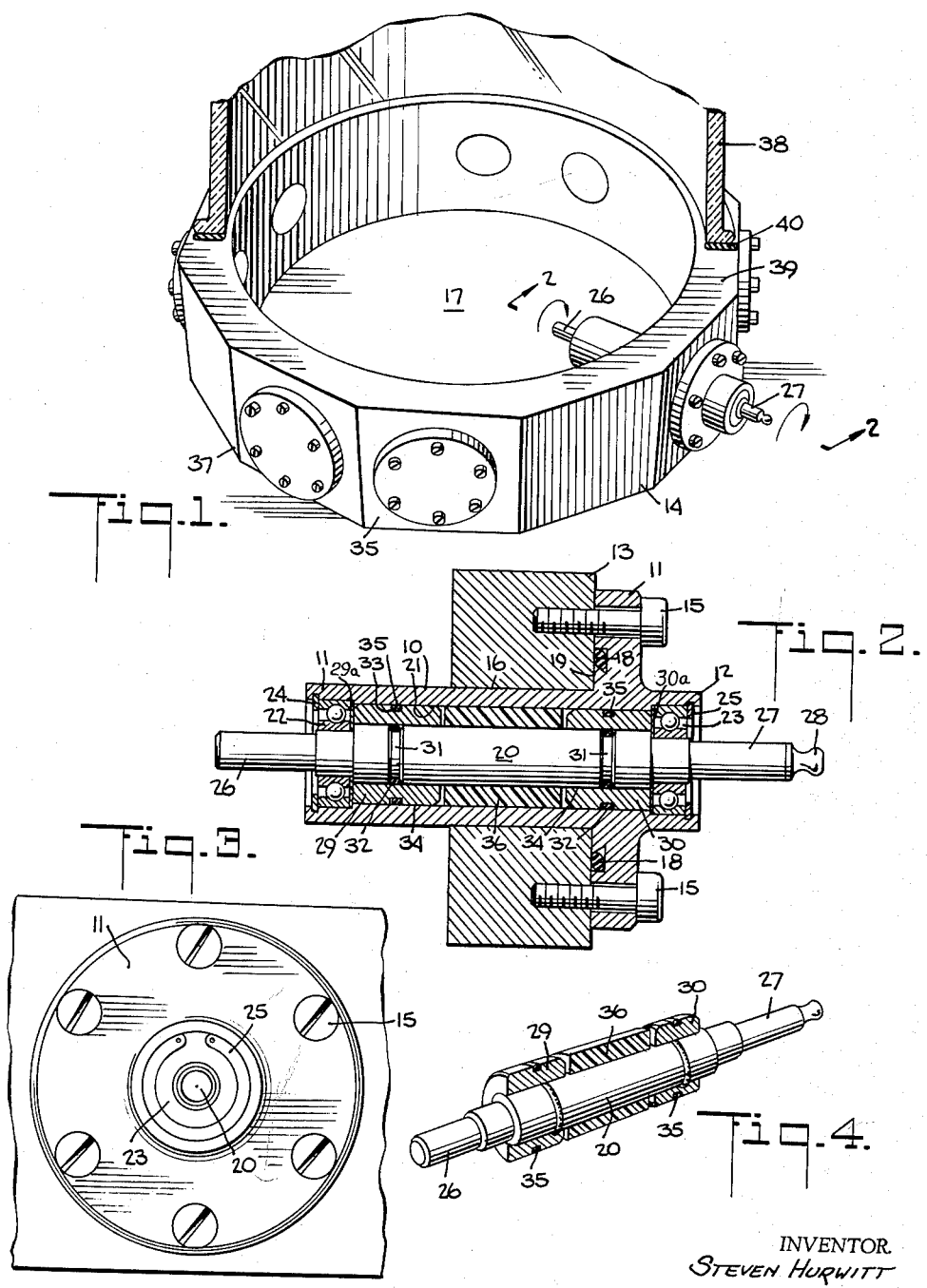
INVENTOR.
STEVEN HURWITT
BY
ATTORNEYS

United States Patent Office 3,179,476
Patented Apr. 20, 1965

3,179,476
ROTARY VACUUM SEAL
Steven D. Hurwitt, 159 Pascack Road, Park Ridge, N.J.
Filed Mar. 4, 1963, Ser. No. 262,628
8 Claims. (Cl. 308—36.1)

This invention relates to apparatus for transmitting high speed rotary motion through the wall of a pressure or vacuum vessel while maintaining a pressure tight seal therein.

In various types of research work, it is frequently desirable to conduct certain operations under vacuum or superatmospheric pressure, or under a particular type of gaseous atmosphere, and it is at the same time necessary to transmit mechanical power from a source external of the device in which the vacuum or other atmosphere is being maintained.

The present invention involves a flanged elongated body member which can be mounted in the wall of a pressure housing and contains a rotary drive shaft therein which is journalled in the body member in a pair of rotatable bearing sleeve members. A seal is maintained between the sleeve members and the drive shaft, and between the sleeve members and the body member, by O rings which permit rotation of the sleeve members but at a substantially lower rotary speed than that of the drive shaft. Between the sleeve members is an intermediate plastic spacing sleeve and at the outer ends of the bearing sleeves are bearing washer means and ball bearing assemblies.

Other objects and features of the invention will become apparent in the specification and claims and in the drawings, in which:

FIG. 1 is an isometric view of a vacuum housing containing one embodiment of the invention;

FIG. 2 is section taken along lines 2—2 of FIG. 1;

FIG. 3 is an end view of the device shown in FIG. 2; and

FIG. 4 is a reduced isometric view and partial section of part of the device shown in FIG. 2.

Referring now to the drawings, one embodiment of the invention is shown which comprises an elongated tubular body member 10 having a radial extending circular mounting flange 11 near the outer end 12 thereof which is securable to the exterior face 13 of collar member 14 by means of bolts 15 as shown. Body member 10 extends through appropriately dimensioned hole 16 in collar 14 and has an inner end 11 protruding into the interior 17 of collar member 14. Suitable gasket means 18 is provided on the inner face 19 of flange 11 to make a pressure tight seal between it and the exterior face 13 of collar 14.

Drive shaft 20 is axially disposed within the bore 21 of body member 10 and is journalled therein near the respective inner and outer ends 11, 12 of body member 10 by ball beearing means 22, 23 which are secured in bore 21 by thrust washers 24, 25. Drive shaft 20 has inner and outer ends 26, 27 which protrude from body member 10 and are adapted for interconnection with various mechanical power transmission means (not shown), and end 27 includes grease fitting means 28 which interconnects with an interior greasing system for the assembly (not shown). Disposed inwardly adjacent ball bearing means 22, 23 are respective metallic bearing sleeve members 29, 30 which receive adjacent portions of drive shaft 20 and are dimensioned for a relatively tight fit with drive shaft 20 and interior bore 21 but are still able to rotate relative to drive shaft 20 and bore 21. Carried in peripheral grooves 31 in drive shaft 20 at approximate intermediate points relative to bearing sleeves 29, 30 are O ring seals 32, and in corresponding grooves 33 in the radially outer surface 34 of sleeve members 29, 30 are similar O ring seals 35, all of which provide pressure tight rotatable mounting of the drive shaft 20 and the sleeve members 29, 30.

Thrust washer means 29a, 30a are disposed between bearing sleeve members 29, 30 and their respective ball bearing means 22, 23.

Similarly disposed on drive shaft 20 between bearing sleeve members 29, 20 is a spacing sleeve member 36 which is made of plastic, e.g. Teflon, or the like, and is dimensioned for a relatively tight fit, with or without rotating, with said drive shaft 20 and bore 21.

In use, the rotary seal assembly can be used as shown in FIG. 1, wherein collar member 14 is assembled in pressure tight relation with a work table, or the like, at its bottom face 37 and carries bell jar 38 on its upper face 39 and is sealed therewith by gasket 40. In order to transmit rotary motion into the interior 17 for various purposes, e.g., stirring, drilling, and so forth, outer end 27 of drive shaft 20 may be interconnected with a motor (not shown) and the drill or stirrer can be connected to the inner end 26.

It can be seen that with the present device, variable speed rotation can be conducted into pressure tight housings without disturbing the pressure differential thereof. The body, drive shaft and bearing sleeves can be made of any suitable material such as stainless steel, brass, and the like, and the O rings or elastomer seals likewise can be made of materials of choice. The thrust washer means 29a, 30a may be made of shim stock or any other suitable material.

The above assembly, in which the bearing sleeve members rotate at a speed less than that of the drive shaft, thereby reduces wear in the sealing gaskets or O rings and permits sustained, pressure-tight operation at substantially higher speeds than would otherwise be permissible. The present device is thus capable of prolonged trouble-free operation.

While one embodiment of the invention has been shown and described, it is to be understood that changes and modifications can be made by those skilled in the art without departing from the scope and spirit of the invention.

What is claimed is:

1. Apparatus for use in connection with a housing having a pressure differential between its interior and exterior and for transmitting rotary motion into said interior from an external power source without affecting said pressure differential comprising an elongated body member having means thereon for pressure tight mounting said body member in the wall of said housing to provide an outer end and an inner end of said body disposed externally and internally of said housing respectively, a drive shaft journalled in said body member with its ends projecting beyond the ends thereof, respective bearing means in the end portions of said body member carrying said drive shaft, independently rotatable bearing sleeve members disposed within said body member receiving said drive shaft, said sleeve members having sealing means in their radially outer surfaces to provide a rotary seal with said body member and corresponding sealing means disposed on said shaft in contact with said sleeve members to provide a rotary seal therebetween.

2. Apparatus for use in connection with a housing having a pressure differential between its interior and exterior and for transmitting rotary motion into said interior from an external power source without affecting said pressure differential comprising an elongated body member having means thereon for pressure tight mounting said body member in the wall of said housing to provide an outer end and an inner end of said body disposed externally and internally of said housing respectively, a drive shaft journalled in said body member with its ends projecting beyond the ends thereof, respective bearing means in the end portions of said body member carrying said drive shaft, independently rotatable bearing sleeve members disposed within said body member receiving said drive shaft, said sleeve members having sealing means in their radially outer surfaces to provide a rotary seal with said body member, corresponding sealing means disposed on said shaft in contact with said sleeve members to provide a rotary seal therebetween and an intermediate spacing sleeve member disposed between said rotatable sleeve members.

3. Apparatus for use in connection with a housing having a pressure differential between its interior and exterior and for transmitting rotary motion into said interior from an external power source without affecting said pressure differential comprising an elongated body member having means thereon for pressure tight mounting said body member in the wall of said housing to provide an outer end and an inner end of said body disposed externally and internally of said housing respectively, a drive shaft journalled in said body member with its ends projecting beyond the ends thereof, respective bearing means in the end portions of said body member carrying said drive shaft, independently rotatable bearing sleeve members disposed within said body member receiving said drive shaft, said sleeve members having sealing means in their radially outer surfaces to provide a rotary seal with said body member, corresponding sealing means disposed on said shaft in contact with said sleeve members to provide a rotary seal therebetween, an intermediate spacing sleeve member disposed between said rotatable sleeve members, and bearing washer means between the outer ends of said rotatable sleeve members and said bearing means.

4. Apparatus for use in connection with a housing having a pressure differential between its interior and exterior and for transmitting rotary motion into said interior from an external power source without affecting said pressure differential comprising an elongated body member having means thereon for pressure tight mounting said body member in the wall of said housing to provide an outer end and an inner end of said body disposed externally and internally of said housing respectively, a drive shaft journalled in said body member with its ends projecting beyond the ends thereof, respective bearing means in the end portions of said body member carrying said drive shaft, means for retaining said bearing means in said body member, independently rotatable bearing sleeve members disposed within said body member receiving said drive shaft, said sleeve members having sealing means in their radially outer surfaces to provide a rotary seal with said body member and corresponding sealing means disposed on said shaft in contact with said sleeve members to provide a rotary seal therebetween.

5. Apparatus for use in connection with a housing having a pressure differential between its interior and exterior and for transmitting rotary motion into said interior from an external power source without affecting said pressure differential comprising an elongated body member having a radially projecting flange thereon adapted for pressure tight mounting said body member in the wall of said housing to provide an outer end and an inner end of said body disposed externally and internally of said housing respectively, a drive shaft journalled in said body member with its ends projecting beyond the ends thereof, respective bearing means in the end portions of said body member carrying said drive shaft, means for retaining said bearing means in said body member, a pair of independently rotatable bearing sleeve members disposed within said body member receiving said drive shaft, said sleeve members having sealing means in their radially outer surfaces to provide a rotary seal with said body member, corresponding sealing means disposed on said shaft in contact with said sleeve members to provide a rotary seal therebetween, an intermediate spacing sleeve member disposed between said rotatable sleeve members, and bearing washer means between the outer ends of said rotatable sleeve members and said bearing means.

6. Apparatus for use in connection with a housing having a pressure differential between its interior and exterior and for transmitting rotary motion into said interior from an external power source without affecting said pressure differential comprising an elongated tubular body member having a radially projecting flange thereon adapted for pressure tight mounting said body member in the wall of said housing to provide an outer end and an inner end of said body disposed externally and internally of said housing respectively, a drive shaft disposed coaxially with said body member with its ends projecting beyond the ends thereof, respective bearing means in the end portions of said body member carrying said drive shaft, means for retaining said bearing means in said body member, a pair of independently rotatable bearing sleeve members disposed within said body member receiving said drive shaft, said sleeve members having sealing means in their radially outer surfaces to provide a rotary seal with said body member, corresponding sealing means disposed on said shaft in contact with said sleeve members to provide a rotary seal therebetween, an intermediate spacing sleeve member disposed between said rotatable sleeve members, and bearing washer means between the outer ends of said rotatable sleeve members and said bearing means.

7. Apparatus for use in connection with a housing having a pressure differential between its interior and exterior and for transmitting rotary motion into said interior from an external power source without affecting said pressure differential comprising an elongated tubular body member having a radially projecting flange thereon adapted for pressure tight mounting said body member in the wall of said housing to provide an outer end and an inner end of said body disposed externally and internally of said housing respectively, a drive shaft disposed coaxially with said body member with its ends projecting beyond the ends thereof, respective bearing means in the end portions of said body member carrying said drive shaft, means for retaining said bearing means in said body member, a pair of metallic independently rotatable bearing sleeve members disposed within said body member receiving said drive shaft, said sleeve members having sealing means in their radially outer surfaces to provide a rotary seal with said body member, corresponding sealing means disposed on said shaft in contact with said sleeve members to provide a rotary seal therebetween, said rotatable sleeve members being adapted to rotate at a slower speed than the speed of said drive shaft, an intermediate plastic spacing sleeve member disposed between said rotatable sleeve members, and bearing washer means between the outer ends of said rotatable sleeve members and said bearing means.

8. Apparatus for use in connection with a housing having a pressure differential between its interior and exterior and for transmitting rotary motion into said interior from an external power source without affecting said pressure differential comprising an elongated tubular body member having a radially projecting flange thereon adapted for pressure tight mounting said body member in the wall of said housing to provide an outer end and an inner end of said body disposed externally and internally of said housing respectively, a drive shaft disposed coaxially with said body member with its ends projecting beyond the ends thereof, respective bearing means in the end portions of said body member carrying said drive shaft, means for retaining said bearing means in said body member, a pair of metallic independently rotatable bearing sleeve members disposed within said body member receiving said drive shaft, said sleeve members having O ring sealing means in their radially outer surfaces to provide a rotary seal with said body member, corresponding sealing means disposed on said shaft in contact with said sleeve members to provide a rotary seal therebetween, said rotatable sleeve members being adapted to rotate at a slower speed than the speed of said drive shaft, an intermediate Teflon spacing sleeve member disposed between said rotatable sleeve members, and bearing washer means between the outer ends of said rotatable sleeve members and said bearing means.

References Cited by the Examiner
UNITED STATES PATENTS

| | | | |
|---|---|---|---|
| 1,429,065 | 9/22 | Daggett | 308—189 |
| 1,626,092 | 4/27 | Master | 308—189 |
| 1,916,897 | 7/33 | Solem | 308—189 |
| 2,895,752 | 7/59 | De Barrie | 287—20 |
| 3,108,839 | 10/63 | Johnson | 308—189 |

ROBERT C. RIORDON, *Primary Examiner.*

CARL W. TOMLIN, *Examiner.*